US007158941B1

(12) United States Patent
Thompson

(10) Patent No.: US 7,158,941 B1
(45) Date of Patent: Jan. 2, 2007

(54) RESIDENTIAL AND BUSINESS LOGISTICS SYSTEM AND METHOD

(76) Inventor: Clifford C. Thompson, 14605 SW. 139th Ave., Tigard, OR (US) 97224

( * ) Notice: Subject to any disclaimer, the term of this patent is extended or adjusted under 35 U.S.C. 154(b) by 0 days.

(21) Appl. No.: 09/454,770

(22) Filed: Dec. 3, 1999

(51) Int. Cl.
G05B 19/418 (2006.01)
A47G 29/12 (2006.01)
G08B 13/14 (2006.01)

(52) U.S. Cl. .......................... 705/8; 232/19; 340/568.1
(58) Field of Classification Search .................. 705/8, 705/1, 18, 406, 500; 232/17, 24, 19; 70/63; 340/568.1; 235/385
See application file for complete search history.

(56) References Cited

U.S. PATENT DOCUMENTS

| | | | | |
|---|---|---|---|---|
| 3,689,155 | A * | 9/1972 | Nishiyama et al. | 355/133 |
| 4,333,603 | A | 6/1982 | Carlson | 232/17 |
| 4,896,024 | A * | 1/1990 | Morello et al. | 235/381 |
| 4,909,052 | A | 3/1990 | Hutwohl | 70/63 |
| 5,000,378 | A | 3/1991 | Dorr et al. | 232/17 |
| 5,082,169 | A | 1/1992 | Aurness et al. | 232/17 |
| 5,262,939 | A | 11/1993 | Vanpoucke | 705/1 |
| 5,407,126 | A | 4/1995 | Coultas et al. | 232/17 |
| 5,624,071 | A * | 4/1997 | Sosan | 232/17 |
| 5,820,018 | A | 10/1998 | Stacy | 232/24 |
| 5,921,117 | A | 7/1999 | Illguth | 70/159 |
| 5,979,750 | A * | 11/1999 | Kindell | 232/19 |
| 6,003,010 | A * | 12/1999 | Scolly et al. | 705/8 |
| 6,085,170 | A * | 7/2000 | Tsukuda | 705/26 |
| 6,105,014 | A * | 8/2000 | Ramsden et al. | 705/410 |
| 6,138,910 | A * | 10/2000 | Madruga | 235/383 |
| 6,344,796 | B1 * | 2/2002 | Ogilvie et al. | 340/568.1 |
| 2002/0067261 | A1 * | 6/2002 | Kucharczyk et al. | 340/568.1 |

OTHER PUBLICATIONS

"ZBox Opens Up," by Ken Cimino, (3 pgs.), http://siliconvally.internt.com/news/article/0,2198,3531_380571,00.html., printed Jan. 30, 2002.

"Joelle Tessler: zBox can accept packages when nobody's home," by Joelle Tessler (3 pgs.); file://C:/WINDOWS/Desktop/zbox.htm., printed Jan. 30, 2002.

"Zbox Opens Up," by Ken Cimino, 2002 ASP Industry Insight, (2 pgs.), printed Jan. 30, 2002.

ABCNEWS.com: A Company Tackles E-Deliveries, "A Company Tackles E-Deliveries," by Roland Jones, 4 pgs., printed Jan. 30, 2002.

(Continued)

Primary Examiner—John W. Hayes
Assistant Examiner—Fadey S. Jabr
(74) Attorney, Agent, or Firm—Darby & Darby PC

(57) ABSTRACT

A method for delivering and shipping parcels using a secure receptacle. The secure receptacle has an access device that controls a lock which is used to secure the contents of the receptacle from unauthorized access. One or more carriers are provided with authorized identification codes that are entered via the access device. Carriers can unlock the receptacle to place a parcel inside and then secure the receptacle to deliver the parcel whether a person is at the delivery location to receive the parcel or not. To ship a parcel, a sender places a parcel in the secure receptacle and notifies the carrier, who accesses the receptacle as described above. The carrier then takes the parcel and delivers it to the specified destination. When parcels are placed in or removed from the secure receptacle, a scanner positioned inside the secure receptacle reads a label on the parcel and sends the information to the carrier or a central processing station for the purposes of tracking parcels and payment transactions.

10 Claims, 4 Drawing Sheets

OTHER PUBLICATIONS

"What is e-box?," Introducing E-box—Deliveries While You're Away, www.e-box.uk.com (4 pgs.), Jan. 30, 2002.

"[splitter] home delivery-box," Brivo Systems, Inc., (2 pgs.), http://ww.murano.at/m.nsf/open/F304543C3088899BC12569840079D6B4, printed Jan. 30, 2002.

IDEO-Brivo Systems, Inc.—The Brivo Box™, (1 pg.); http://www.ideo.com/studies/brivo.htm.

"Leave It In The Box. Can a new digital appliance solve home delivery dilemmas?," (4 pgs.),http://www.businessweek.com:/2000/00_50/b3711085.htm?scriptFramed, printed Jan. 30, 2002.

Delivery Vault/Unattended Delivery Solutions, dVault, (26 pgs.); http://www.dvault.net/; Jan. 30, 2002.

Giraffe Marketing—the home delivery solution, http://www.giraffemarketing.co.uk/, (11 pgs.); printed Jan. 30, 2002.

\* cited by examiner

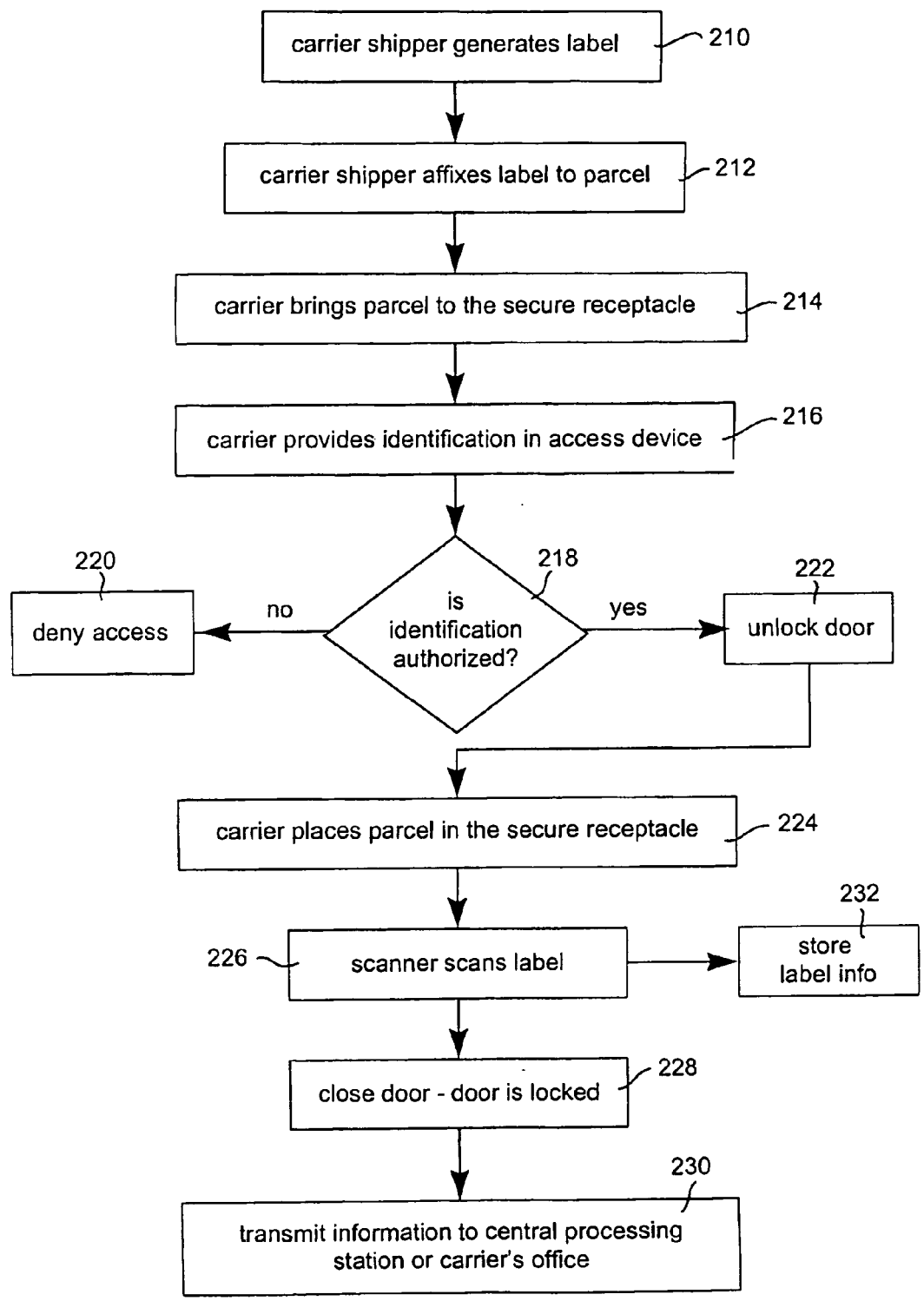

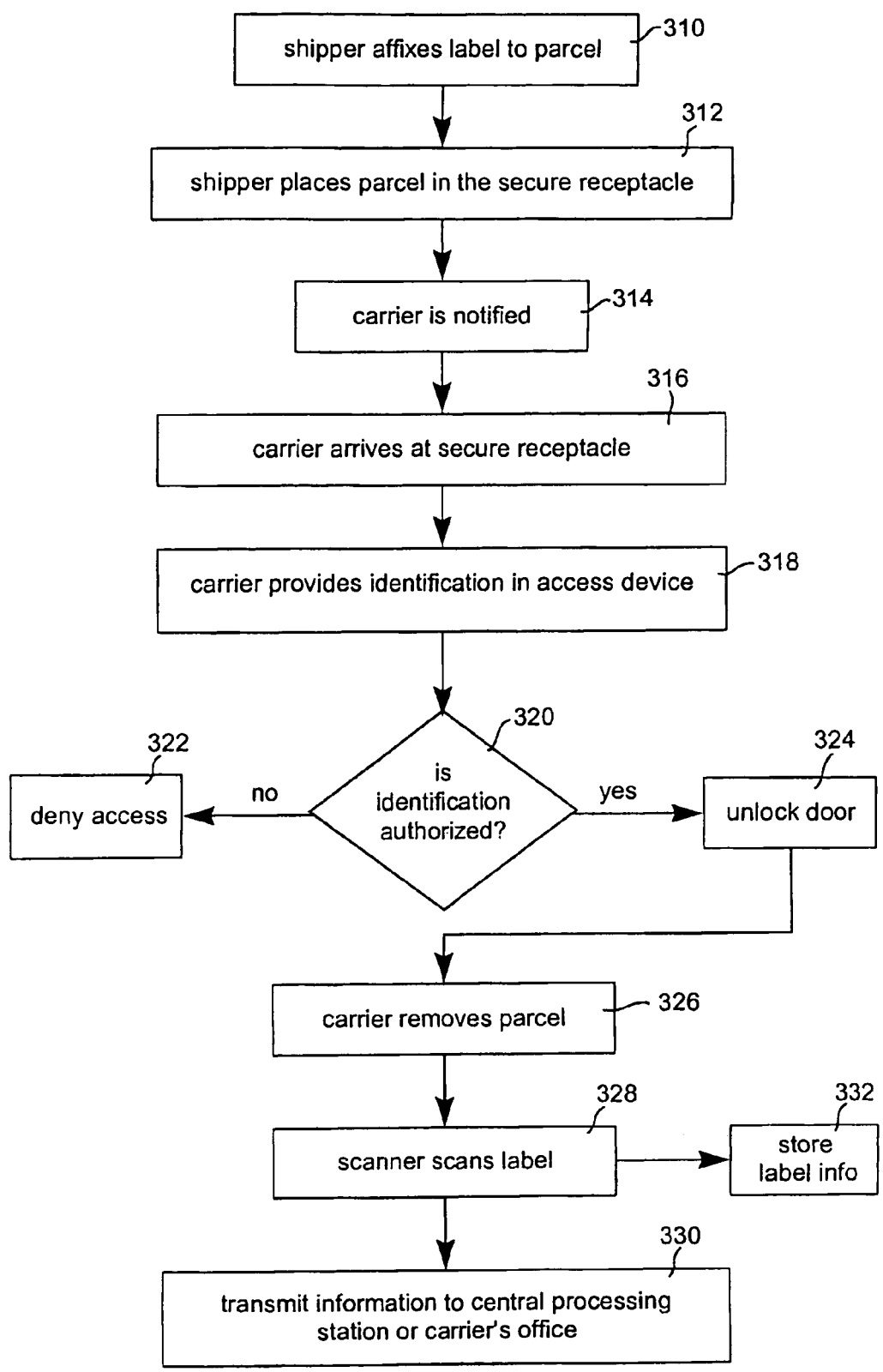

RESIDENTIAL AND BUSINESS LOGISTICS SYSTEM AND METHOD

FIELD OF INVENTION

The present invention relates to parcel delivery and shipping methods and more particularly, to a secure delivery and shipping method.

BACKGROUND OF THE INVENTION

Conventional delivery of parcels to residences and businesses requires that someone personally receive the parcel from the carrier and sign an acknowledgment of receipt. If the delivery is to occur at a private residence, the resident must be home at the time the carrier arrives. Alternatively, one can sign or authorize a release form, whereby the carrier will leave the parcel on the doorstep, porch or elsewhere unattended. If a parcel is to be delivered to a business, someone must be present at the business to accept the parcel. Finally, a recipient can go to the carrier's location during its business hours of operation and pick up the parcel personally. The fact that the delivery must be made to a person capable of receiving the parcel or that it must be left unattended and unsecured is cumbersome.

Likewise, conventional shipping methods require that someone personally give the parcel to the carrier or leave the parcel unattended outside so the carrier can pick it up. Transferring the parcel to the carrier can take place at the carrier's location or at the sender's location. Shipping methods have developed to include free-standing deposit drops for small parcels at select locations. However, there is a significant limitation on the size of the parcels that may be shipped in this manner. Moreover, this does not provide significant convenience for the individual wanting to ship a parcel from his/her residence.

Therefore, there is a need in the art for a method of delivery that is sufficiently secure to avoid the necessity of personal contact for guaranteed delivery. What is further needed in the art is such a method for delivering and shipping parcels that provides automated notification that the parcels are in transit. The present invention satisfies these and other needs.

SUMMARY OF THE INVENTION

The present invention provides a system and method for facilitating delivery and shipping of parcels any time of day using a secure receptacle and better prevents theft and weather damage of parcels. The secure receptacle includes a locking mechanism configured so that only the recipient and an authorized carrier can open the receptacles and access any parcels. Furthermore, the present invention also provides automated notification using a communication link between the secure receptacle and one or more carriers. The carrier can be automatically notified when a parcel is placed within the secure receptacle to be shipped so that the carrier knows to pick up the parcel from that location. Likewise, the recipient and carrier of the parcel can be notified automatically once a parcel has been delivered and placed in the secure receptacle.

In accordance with one aspect of the present invention, a method is described for delivering a parcel to a secure receptacle. In that method, a carrier carries a parcel to a designated location and accesses the secure receptacle. The carrier places the parcel within the receptacle and secures the receptacle. Finally, the placement of the parcel within the secure receptacle is automatically registered.

In particularly preferred embodiments, the inventive method can include one or more of the following steps, alone or in combination: (a) The receptacle locks automatically when the door is closed. (b) A scanner inside the secure receptacle scans a code on the parcel and stores the code in a memory. (c) After the secure receptacle is resecured with the parcel inside, a remote location is accessed and the placement data is conveyed to the remote location. (d) In response to the input of an authorized identifier, the secure receptacle is unlocked. The authorized identifier can be for example a magnetic strip card, code from a key pad, or a smart card. (e) The secure receptacle can have a waterproof shell. (f) The step of placing the parcel in the secure receptacle can be performed at night. In particularly preferred embodiments, a log is generated during the process of delivery. A log entry is generated in response to each of the following steps: the accessing step, the resecuring step, and the registering step.

In accordance with a further aspect of the present invention, a method is described for shipping a parcel from a secure receptacle. In that method, a carrier arrives at the secure receptacle containing the parcel to be shipped and accesses the secure receptacle. The carrier removes the parcel from the secure receptacle and the removal of the parcel is registered.

In particularly preferred embodiments, the sender labels the parcel in preparation for shipping, places the parcel in the secure receptacle and notifies the carrier of the placement of the parcel in the particular secure receptacle before the carrier arrives at the secure receptacle. After the sender places the parcel in the secure receptacle, the secure receptacle is locked. To label the parcel, a code containing at least the recipient's information is generated and affixed to the parcel. The carrier is notified by the transmission of the placement data to a remote location by a communication link. Once the carrier is notified, a courier is dispatched to the location of the secure receptacle containing the parcel to be shipped. Labeling the parcel can include one or both of the steps of electronically measuring the dimensions of the parcel and electronically measuring the weight of the parcel. The secure receptacle can be in a locked position or an unlocked position and it is unlocked in response to an authorized identifier. The authorized identifier is received from an access device. The authorized identifier can be, for example, a magnetic card, a code from a key pad or a smart card.

In particularly preferred embodiments, a scanner inside the secure receptacle reads the code on the parcel when the parcel is removed from the secure receptacle and the code is stored in a memory. To register the removal of the parcel, a remote location is accessed by a communication link and the removal data is conveyed to the remote location. The step of removing the parcel from the secure receptacle can be performed at night. In particularly preferred embodiments, a log is generated during the process of shipping. A log entry is generated in response to each of the following steps: the accessing step, the registering step, the securing step, and the notifying step.

In accordance with a further aspect of the present invention, a system for delivering and shipping a parcel including a secure receptacle that receives the parcel being delivered or shipped. In that system, a scanner is positioned within the secure receptacle which scans information on the parcels. In addition, a communication device is connected to the output of the scanner.

In particularly preferred embodiments, the secure receptacle includes a platform for holding the parcel, a door and a lock. The door selectively provides access to the platform and the lock secures the door when the door is closed. The lock disengages upon signal from an access device. The access device is, for example, a magnetic strip card reader, a key pad or a smart card reader. The communication device receives information from the scanner and transmits the information to a remote location after the door is locked.

In particularly preferred embodiments, the inventive method can include one or more of the following features alone or in combination: (a) A button can be connected to the communication device for initiating communication to a remote location. (b) A scale for weighing the parcel and registering the weight. (c) A ruler for measuring the parcel and registering the dimensions. (d) The secure receptacle can have a waterproof shell.

These and other features, embodiments, and aspects of the present invention can be appreciated from the following drawing description and detailed description of a preferred embodiment.

BRIEF DESCRIPTION OF THE DRAWINGS

FIG. 4 is a flow chart showing a method for delivering parcels in accordance with the preferred embodiment of the present invention; and FIG. 5 is a flow chart showing a method for shipping parcels in accordance with the preferred embodiment of the present invention.

DETAILED DESCRIPTION OF A PREFERRED EMBODIMENT

In a preferred embodiment of the present invention, a system and a method are provided which facilitate shipping to and from designated residential locations. However, the invention has utility in other applications, such as to facilitate shipping between a variety of locations including both commercial and residential locations.

Figure 1:
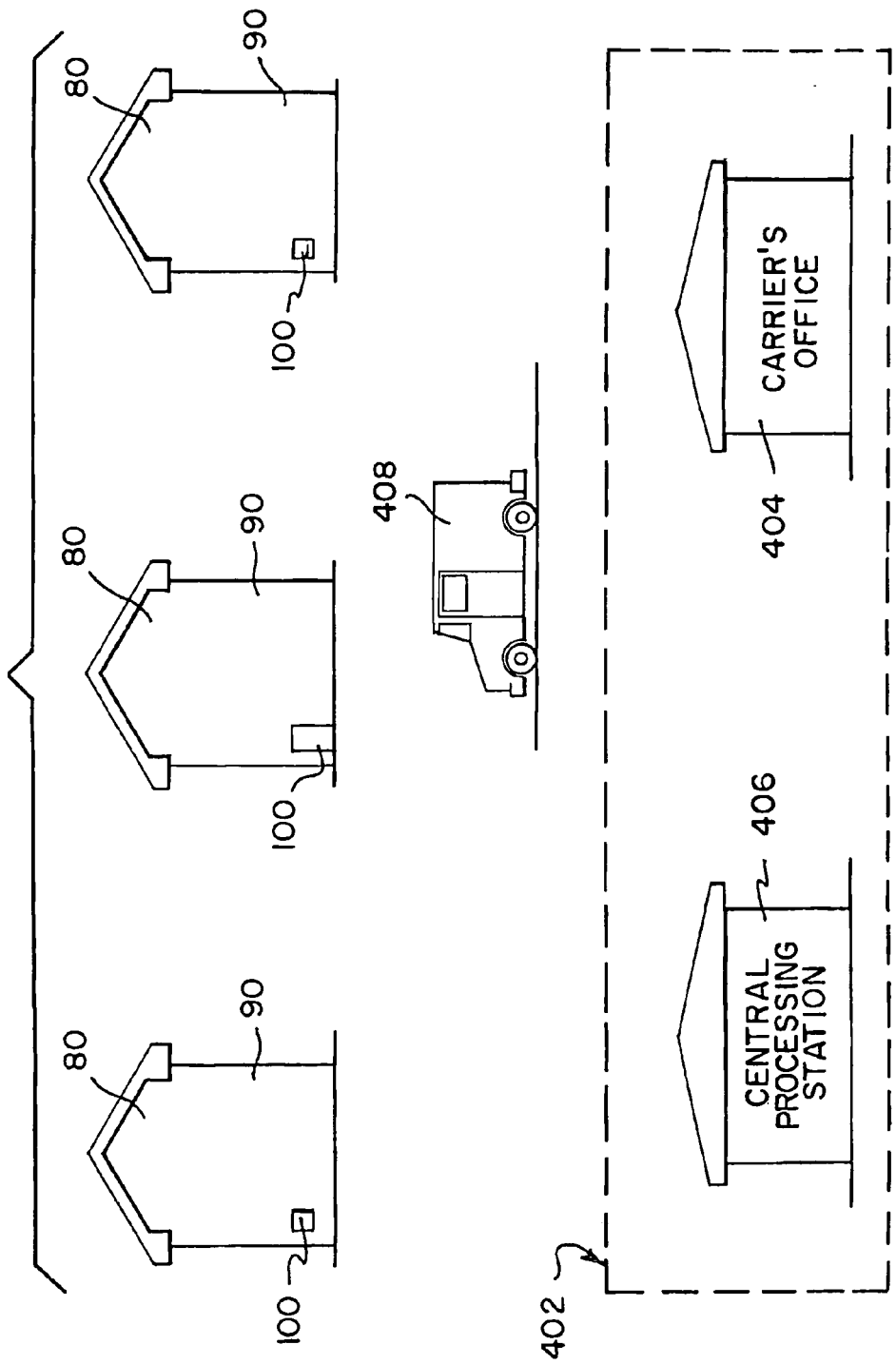
FIG. 1 is a schematic diagram of a preferred embodiment of the present invention.

By way of overview and introduction, the present invention provides a system and method by which parcels can be securely delivered to and picked up from edifices such as homes and offices regardless of whether someone is there to greet the delivery person. As illustrated in FIG. 1, the invention provides a secure receptacle 100 within a wall 90 of each of a plurality of edifices 80. As can be appreciated from the following detailed description, the secure receptacles 100 are in communication with a remote location 402 such as a carrier's office 404 or a central processing station 406. Communication can be by any conventional means, including land line telecommunication links, a coaxial cable, DSL, or satellite, as understood by those skilled in the art. A fleet of carriers 408, each of which is affiliated with a particular carrier's office 404, are dispatched from time to time to deliver parcels to the edifices 80 in accordance with the delivery instructions associated with such parcels. In like manner, the carriers 408 can pick up parcels maintained within secure receptacles 100 at each of the edifices 80 in response to requests made to the carrier's office 404. Such requests, in accordance with the preferred embodiment of the invention, are automatically initiated through the communication link described above, upon insertion of a parcel into the secure receptacle 100. Such requests can be conveyed directly to the carrier's office 404 or through a central processing station 406 which serves as an intermediary, for example, to select one of several different potential carriers to fulfill the customer's delivery request. The parcels may contain, for example, documents, currency, groceries, prescription medication, general merchandise, or pets. The details of the secure receptacle 100 in accordance with the invention and the delivery and shipment processes referred to above can be appreciated from the following detailed description of certain preferred arrangements of the secure receptacle 100 and processes for delivery and shipment of parcels.

Figure 3:
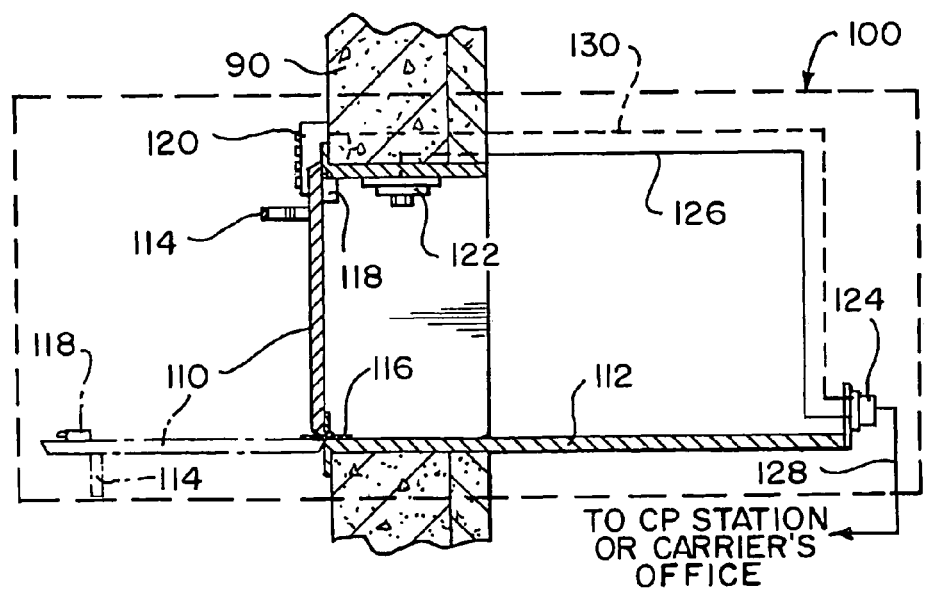
FIG. 3 is a sectional view of a secure receptacle in accordance with the preferred embodiment of the present invention.

The system of the preferred embodiment includes a secure receptacle that is preferably attached to the inside wall of a house or garage. Referring now to FIG. 3, the secure receptacle 100 has a door 110 that is positioned in the wall 90. Preferably, the door has a handle 114 and is hinged 116 at the bottom so that the door acts as a staging area when fully extended, its open position (as shown in phantom). From outside the wall, a parcel (not shown) is placed on the open door and slid onto a platform 112 within the secure receptacle. Alternatively, the door 110 may be hinged or attached on the side (instead of at the bottom) so that the door swings or slides open to the right or left and the parcel is placed directly into the secure receptacle.

The platform 112 of the secure receptacle is installed on the inside of a room or building and is readily accessible from inside room or building. In another embodiment, the platform on the inside of the room or building is the base of an enclosed cubical structure having up to six sides, one of which is the door 110 in the wall 90. Alternatively, the secure receptacle is a free-standing, fully-enclosed structure having the other features of the described preferred embodiment except that it is not installed in a wall. The secure receptacle can be provided in any useful size.

The door 110 includes a lock 118 that secures the door when in the closed position (as shown in solid lines). Upon closing the door, the lock is preferably automatically engaged.

Figure 2:
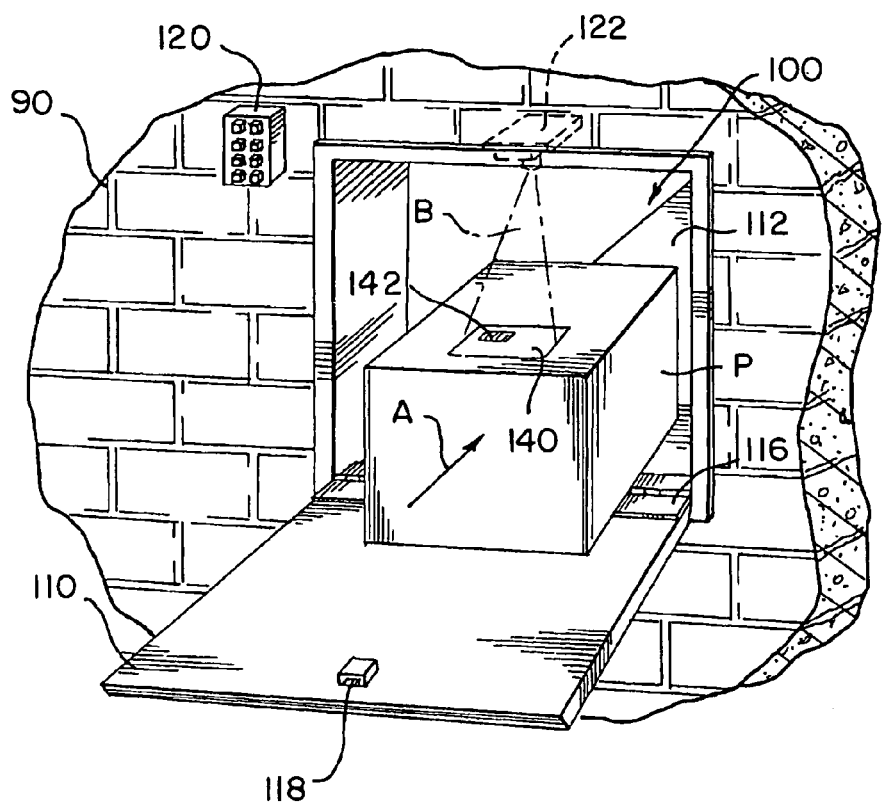
FIG. 2 is a perspective view of a secure receptacle in accordance with the preferred embodiment of the present invention.

Referring to FIGS. 2 and 3, the lock 118 on the door is controlled by an access device 120 positioned on or near (e.g., on the wall 90) the door. To open the door 110, the door must be unlocked and, to unlock the door, an authorized identification must be entered into the access device. The access device can be constituted in many forms, such as, for example, a magnetic strip card reader, a key pad, or a smart card reader. The identifiers provided to persons who are authorized to open the receptacle are preferably in the form of encoded information on a magnetic strip card or smart card or are in the form of a code that is known to the authorized person for entry at a key pad.

The secure receptacle preferably houses a scanner 122 that is positioned to scan information 142 on the parcels P that are placed in or removed from the secure receptacle 100. In preparation for shipping a parcel, a label 140 is generated and affixed on the parcel P. The label 140 indicates various information 142, for example one or more of the following: a parcel identification number, destination information, information identifying the carrier, and information identifying the sender. The label information 142 is preferably embodied in a bar code or other machine-readable format (e.g., magnetic ink).

As shown in FIG. 2, the parcel P is inserted into the receptacle 100 while the door 110 is in its open position or state. The parcel P is advanced in the direction of arrow A under and through the path of a beam B cast by the scanner 122. The label 140 is positioned on the parcel so that it passes through the beam B. The encoded information on the label 140 is preferably automatically registered by the scanner 122 as the parcel P is inserted into the receptacle. Likewise, upon withdrawing the parcel from the receptacle, the label 140 is again scanned. In the preferred embodiment, the encoded information 142 on the label 140 is coordinated with the identifier entered into the access device 120 to define a record of which access code is used when a particular parcel is received into the receptacle and when a particular parcel is removed from the receptacle.

Referring again to FIG. 3, the secure receptacle also contains a communication device 124 which receives information 142 from the scanner 122 through a connection 126 and sends the information to a remote location, for example, a central processing station or the carrier's office. Preferably, the transmission of the information 142 is triggered by the engagement of the lock 118 securing the door 110 in the closed position. This information 142 can be sent directly to a carrier identified on the parcel P itself or the label 140 to confirm delivery or pick-up of the parcel. Information is transmitted over conventional telecommunication lines 128 or by a wireless communication link. The communication device 124 also has a connection 130 to the access device 120 so that the access device can send information to the remote location, indicating when the secure receptacle was accessed (unlocked) and by whom on the basis of the identifier received at the access device 120. The access device can also receive from a remote location information concerning which identifiers are authorized to access the particular secure receptacle for a given period. Alternatively, the access device can be configured to authorize a particular selection of identifiers. Naturally, the circuitry for the scanner, the access device, and the communication device can be combined into a single device.

The secure receptacle has other optional features. The secure receptacle can be waterproof. Conventional construction techniques and materials are used in constructing and installing the secure receptacle in such a way as to prevent water from entering the secure receptacle while in its locked state.

The secure receptacle can be lined with insulation in order to preserve perishable items that may be in the parcel. This feature can be particularly applicable where the parcels being delivered contain groceries or medication.

Optionally, the secure receptacle can be configured to notify the remote location that a parcel is in the secure receptacle and is ready for pick-up in response to a button which is positioned for use by the receptacle owner.

The secure receptacle optionally has a scale which can measure the weight of the parcel. The weight can then be included among the information on the label 140. Preferably, the secure receptacle also has a ruler which provides dimensional information concerning the parcel for inclusion in the label information. The ruler electronically indicates the edges of the parcel P with reference to a fixed point in the receptacle 100. Such information is conventionally utilized by the carrier to determine the price for shipping that parcel.

The labels 140 can be generated using a custom or standard printer. A personal computer can be used with a standard printer, for example, to generate the labels 140 under control of a program operating within the computer with input from the user (such as the size and weight of the parcel). Alternatively, the personal computer can be connected to the Internet such that the customer can access software at a server on the Internet to generate the required label.

The Delivery Process

Referring to FIG. 4, a particular carrier has a parcel to be delivered to a given location, e.g., resident Y. At step 210, the carrier generates a label 140 and at step 212 affixes the label on the parcel. That label includes the machine-readable code 142 that is processed at the receptacle 100. Alternatively, the shipper generates the label and affixes it to the parcel before providing it to the carrier for delivery. At step 214, the carrier delivers the parcel bearing the label 140 to the location of resident Y at which a secure receptacle 100 is installed.

The secure receptacle is ordinarily locked. The carrier, however, can unlock the door using the access device 120 and an authorized identifier. At step 216, the carrier enters an identification in the access device 120. The identification is tested, at step 218, to determine whether it is authorized to access the particular secure receptacle at that time. Provided the identification is authorized, the door is unlocked and the carrier can access the receptacle 100. Once the carrier opens the door, at step 224, the carrier places the parcel in the secure receptacle such that the label 140 on the parcel is facing the scanner 122.

In the industry, there are standard codes identifying each carrier. The identification can be a compound of the standard code for the carrier and a code for the delivery person. The individual identifications are assigned to the delivery persons by the central processing station or carrier's office.

The access device can be configured to accept these standard codes as identifiers that are authorized to access the secure receptacle. The access device authorizes the identification of a particular delivery person based on the carrier code embedded in the identification.

Alternative to the preconfigured access device, the access device can confer with the remote location to determine whether an identification is authorized to access the secure receptacle. The central processing station or carrier's office transmits a message to the access device 120 at the destination secure receptacle indicating the particular identification (or set of identifications) that is authorized to access that secure receptacle for a fixed period of time. Subsequently, at step 16, when the carrier provides identification 216 previously assigned to him into the access device, the access device will recognize the identification as authorized (upon the testing step 218) and disengage the lock 118 securing the door 110 at step 222. Alternatively, at step 216 when the carrier provides identification previously assigned to him, the access device sends the identification to the central processing station or the carrier's office, which determines whether the identification is authorized and returns a signal to the access device indicating authorized or not authorized at step 218.

Continuing reference to FIG. 4, as the parcel is inserted into the secure receptacle, as indicated at step 224, the scanner reads the label on the parcel at step 226. Alternatively, the scanner 122 reads the label 140 on the parcel in response to the locking of the door. At step 228, the carrier closes the door which then locks automatically.

At step 230, the scanner 122 sends the information to the communication device 124 which in turn transmits the information to the remote location. For example, if the remote location is a central processing station charged with the responsibility of monitoring the shipping and delivery of parcels, the central processing station notifies the carrier's office that the parcel was delivered to resident Y. In addition, the recipient can be notified that a parcel was delivered to the recipient's secure receptacle 100, for example, by phone or e-mail message. Optionally, the remote location (e.g., central processing station or carrier's office) confirms that the parcel identified by the label information is intended for delivery at that secure receptacle. The remote location returns a signal to the secure receptacle which triggers an indicator thereby informing the carrier that an error has occurred, i.e., the parcel was not intended for delivery at that location. At step 232, the information that was received by the scanner is also stored locally or centrally so that the sender, recipient, or carrier can view or print a record of select past shipping transactions and associated costs as described below.

The delivery of parcels can be performed any time of day or night. The carrier is not inherently limited to delivery during certain hours when, for example, the recipient is likely to be home. The carrier can access the secure receptacle without inconveniencing the recipient. The carrier has access only to the secure receptacle, so the safety of the recipient's home, office, and property are not compromised in the delivery process, yet the parcel P can still be delivered and held securely in the receptacle 100. With the elimination of inherent limitations associated with conventional methods, the carrier may, for example, perform the delivery during the hours when traffic is least congested (e.g., at night).

The Shipping Process

Referring to FIG. 5, a customer can prepare a parcel P for pick-up and shipping even when no one is at the pick-up location while the parcel P is securely held in the receptacle 100. The customer generates a label with the required shipping information. The shipping information can specify a destination or a recipient, and optionally, the weight and dimensions of the parcel P. In addition, the label 140 includes the machine-readable code 142 for processing by the scanner 122. The machine-readable code includes the identity of the carrier and selected (e.g., all) shipping information. Preferably, the customer prints the label 140 and affixes it to the parcel at step 310.

At step 312, the customer places the parcel with the label 140 inside the secure receptacle 100. The parcel is placed in the secure receptacle is such position that the scanner can read the label, e.g., during insertion of the parcel P in the direction of arrow A (see FIG. 2).

After the parcel is secured inside the secure receptacle 100, the carrier is notified at step 314 that the parcel is ready for pick-up at the specified location. Preferably, this notification is automatically transmitted from the scanner (using the communication device) to a designated remote location which, in turn, transmits the notification to the carrier's office, if not there already. Alternatively, the customer can directly notify the carrier that the parcel is ready for pick-up.

After the carrier's office receives the information from the communication device or from a central processing station, the carrier dispatches a delivery person to the location of the shipper's secure receptacle. At step 316, the carrier arrives at the secure receptacle to pick up the parcel. The carrier provides its identification to the access device 120, at step 318. At step 320, the identification is tested to determine (in the manner described in the delivery process) whether it is authorized for access at that time. In the event that the identification is authorized, the door is unlocked at step 322. As the carrier removes the parcel from the secure receptacle, at step 326, the parcel P passes the scanner which, at step 328, reads the label 140. At step 330, the scanner transmits the information from the label to the designated remote location, or the scanner sends the information to the communication device which transmits the information to the remote location. The carrier's office or central processing station is thus notified that the parcel has been picked up. After the carrier has possession of the parcel, the carrier delivers the parcel in the manner described above or in a conventional manner. At step 332, the scanned information is also stored locally, at the central processing station and/or carrier for tracking and logging purposes.

The shipping can be performed any time of day or night. The sender can place the parcel in the secure receptacle at any time and the carrier can pick up the parcel anytime thereafter.

The remote location handles the financial aspects of the shipping transaction. Preferably, prior to shipping a parcel, the customer notifies the remote location that a parcel is ready for pick-up, and the remote location processes the payment charge for shipping the parcel to its specified destination. If no carrier was specified, that is, if the remote location is a central processing station, empowered to select a carrier for the shipment, the central processing station computes the price and updates the appropriate accounts accordingly. Clearing the financial transaction is performed in a conventional manner. On the other hand, if the carrier was specified, then the central processing station either notifies the carrier that a parcel is to be picked up, or the carrier is notified directly, and the payment is processed by the carrier or the central processing station.

In a further embodiment, customers have personal accounts with the central processing station or a financial institution (e.g. a credit card company) that associates the customer information with payment information and with set of preferences for shipping. For example, the personal account for a customer associates the customers' name, address and other contact information, location and identification of the customer's secure receptacle, the customer's credit card account, and a list of carriers in order of preference. When the customer orders merchandise from a vendor, the customer supplies his personal account number as a method of payment. Upon receiving this personal account number, the vendor has all the information required to complete the order: the shipping address, the preferred carrier to ship the parcel, and customer's credit card account. The association and coordination between the personal accounts for customers and the customers' secure receptacles increases the efficiency of the shipping and delivery methods as well as increased security and accuracy.

The Tracking of Deliveries and Shipments

Every time the secure receptacle 110 is unlocked due to the provision of an authorized identification (at steps 216 and 318) in the access device 120, a record of that data is created and logged. The record includes the time and date of access, an identification of which secure receptacle was accessed, and the identification provided to the access device. This log entry then indicates who accessed which secure receptacle and at what time.

Furthermore, every time a parcel P is placed in or removed from the secure receptacle 100, the scanner 122 attempts to read the label on the parcel P. When a parcel is properly labeled and properly positioned in the secure receptacle, the scanner reads the machine-readable code 142 and stores the information as a record in the log. The information encoded on label 140 generally includes an identification of the parcel as well as destination and sender information, as described above.

When the log is reviewed, the records of access combined with the records of parcels provide a complete history of the use of the secure receptacle. When a parcel is not labeled or not properly positioned, the scanner cannot read the code and the resulting absence of a record in the presence of a previous or subsequent record of access is likewise informative.

The invention has been described in connection with a particular embodiment but encompasses, without limitation, the full scope of the subject matter in the appended claims and includes insubstantial variations in elements and method steps.

What is claimed is:

1. A method for delivering a parcel by a carrier to a secure receptacle at a location of an intended recipient, comprising the steps of:
   (a) dispatching the carrier with the parcel to the location of the intended recipient in accordance with delivery instructions on the parcel, the location corresponding to the address of the intended recipient on delivery instructions provided by a sender;
   (b) the carrier accessing the secure receptacle at the location;
   (c) the carrier placing the parcel within the accessed secure receptacle;
   (d) the carrier securing the secure receptacle after placing the parcel within the secure receptacle;
   (e) the carrier making further deliveries at additional locations after having placed the parcel within the secure receptacle; and
   (f) using a scanner positioned within the secure receptacle, automatically registering the placement of the parcel within the secure receptacle after the securing step by scanning a label on the parcel to obtain the placement data in response to the receptacle being secured and communicating the placement data comprising at least a portion of the delivery instructions from the scanned label on the parcel over a communication link.

2. The method as in claim 1, including the additional steps of:
   reading a code on the parcel in response to the securing step; and
   storing the code in a memory.

3. The method as in claim 1, the registering step including the additional steps of:
   accessing a remote location by the communication link; and
   conveying the placement data to the remote location;
   wherein the registering step is in response to the securing step.

4. The method as in claim 1, wherein the secure receptacle has a locked state and an unlocked state, and wherein the accessing step includes the additional step of:
   moving from the locked state to the unlocked state in a response to an authorized identifier.

5. The method as in claim 4, wherein the authorized identifier is received from at least one of: a magnetic strip card, a key pad, and a smart card.

6. The method as in claim 1, wherein the secure receptacle has a locked state and an unlocked state, and wherein the securing step includes the additional step of:
   moving from the unlocked state to the locked state after receiving the parcel.

7. The method as in claim 1, including the additional step of generating a log entry in response to the accessing step.

8. The method as in claim 1, including the additional step of generating a log entry in response to the securing step.

9. The method as in claim 1, including the additional step of generating a log entry in response to the registering step.

10. The method as in claim 1, where in the placing step is performed at night.

* * * * *